US010241378B2

(12) United States Patent
Furuya et al.

(10) Patent No.: US 10,241,378 B2
(45) Date of Patent: Mar. 26, 2019

(54) OPTICAL MODULATION DEVICE

(71) Applicant: SUMITOMO ELECTRIC INDUSTRIES, LTD., Osaka (JP)

(72) Inventors: Akira Furuya, Yokohama (JP); Taizo Tatsumi, Yokohama (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 49 days.

(21) Appl. No.: 15/660,618

(22) Filed: Jul. 26, 2017

(65) Prior Publication Data
US 2018/0039152 A1 Feb. 8, 2018

(30) Foreign Application Priority Data
Aug. 8, 2016 (JP) ................. 2016-155857

(51) Int. Cl.
G02F 1/225 (2006.01)
G02F 1/01 (2006.01)
(Continued)

(52) U.S. Cl.
CPC ....... *G02F 1/2255* (2013.01); *G02B 26/0841* (2013.01); *G02F 1/017* (2013.01);
(Continued)

(58) Field of Classification Search
CPC .. G02B 26/00; G02B 26/0841; G02B 6/1228; G02B 6/125; G02B 6/29353; G02B 6/29355; H01S 3/00; H04B 10/04; H04B 10/12; H04B 10/07955; H04B 10/505; H04B 10/5051; H04B 10/5161;
(Continued)

(56) References Cited

U.S. PATENT DOCUMENTS 6,937,790 B2  8/2005 Bridges
7,515,775 B1  4/2009 Kucharski et al.
(Continued)

FOREIGN PATENT DOCUMENTS

EP  2615490  7/2013

OTHER PUBLICATIONS

Extended European Search Report (issued for Application No. EP 17184376.6 dated Jan. 2, 2018).

Primary Examiner — Loha Ben
(74) Attorney, Agent, or Firm — Smith, Gambrell & Russell, LLP.

(57) ABSTRACT

An optical modulation device includes: a Mach-Zehnder modulator including a semiconductor waveguide; a plurality of phase modulators that are spaced from each other; a first amplifier that is coupled with an input transmission line transmitting an electrical signal, has an input impedance substantially equal to a characteristic impedance of the input transmission line; a first interconnection that is coupled to the first amplifier and transmits the electrical signal to a first end of one of the plurality of phase modulators that is provided on an input side of the Mach-Zehnder modulator; a second interconnection that is coupled to the first amplifier and transmits the electrical signal to a first end of the other of the plurality of phase modulators that is provided on an output side of the Mach-Zehnder modulator; and a plurality of termination resistors respectively coupled to second ends of the plurality of phase modulators.

15 Claims, 13 Drawing Sheets

(51) Int. Cl.
*G02F 1/017* (2006.01)
*G02B 26/08* (2006.01)
*H04B 10/516* (2013.01)
*H01S 3/00* (2006.01)
*G02F 1/21* (2006.01)

(52) U.S. Cl.
CPC ............ *G02F 1/0121* (2013.01); *G02F 1/225* (2013.01); *H04B 10/5161* (2013.01); *G02F 1/01* (2013.01); *G02F 2001/212* (2013.01); *H01S 3/00* (2013.01)

(58) Field of Classification Search
CPC ............ H04B 10/5162; H04B 10/5165; H04B 10/541; H04B 10/556; H04B 10/5561; G02F 1/00; G02F 1/01; G02F 1/0121; G02F 1/0123; G02F 1/017; G02F 1/025; G02F 1/0356; G02F 1/07; G02F 1/218; G02F 1/2255; G02F 1/225; G02F 1/2257; G02F 2001/0157; G02F 2001/127; G02F 2001/212; G02F 2201/12
USPC ....... 359/237, 259, 279, 321, 333, 337, 344; 398/158, 183, 188, 195, 200, 201, 208, 398/214; 385/3
See application file for complete search history.

(56) References Cited

U.S. PATENT DOCUMENTS

| | | | | |
|---|---|---|---|---|
| 7,817,923 | B2 * | 10/2010 | Akiyama | ............ G02F 1/0123 398/183 |
| 8,149,492 | B2 * | 4/2012 | Ghidini | ............ G02F 1/0123 359/245 |
| 8,620,116 | B2 * | 12/2013 | Uesaka | .................. G02F 1/225 385/1 |
| 8,638,486 | B2 * | 1/2014 | Matsuda | ............ G02F 1/0123 359/259 |
| 8,643,929 | B2 * | 2/2014 | Gill | ...................... G02F 1/225 359/237 |
| 9,046,703 | B2 * | 6/2015 | Fukuda | ............ G02F 1/0121 |
| 9,140,955 | B2 * | 9/2015 | Hoffmann | ............ G02F 1/025 |
| 9,244,327 | B2 * | 1/2016 | Prosyk | ................ G02F 1/225 |
| 9,274,399 | B2 * | 3/2016 | Yamaji | ............ G02F 1/0123 |
| 9,817,294 | B2 * | 11/2017 | Goi | ...................... G02F 1/025 |
| 2003/0227666 | A1 | 12/2003 | Bridges | |
| 2007/0237444 | A1 | 10/2007 | Keil | |
| 2010/0060972 | A1 | 3/2010 | Kucharski et al. | |
| 2012/0315036 | A1 | 12/2012 | Kucharski et al. | |
| 2018/0196328 | A1 * | 7/2018 | Furuya | ............ H04B 10/541 |
| 2018/0267384 | A1 * | 9/2018 | Padmaraju | ............ G02F 1/225 |

* cited by examiner

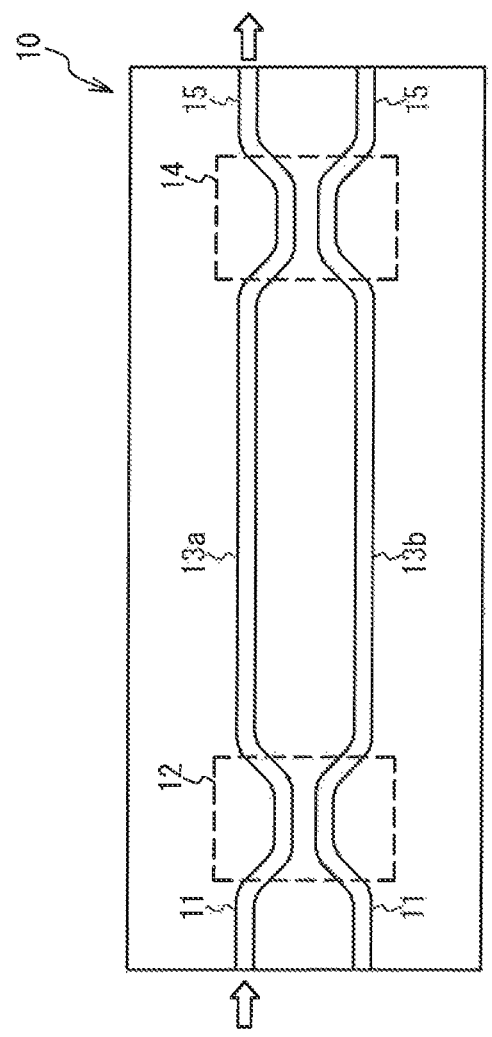

OPTICAL MODULATION DEVICE

CROSS-REFERENCE TO RELATED APPLICATION

This application is based upon and claims the benefit of priority of the prior Japanese Patent Application No. 2016-155857, filed on Aug. 8, 2016, the entire contents of which are incorporated herein by reference.

BACKGROUND

(i) Technical Field

The present invention relates to an optical modulation device.

(ii) Related Art

As a device for modulating a light in accordance with an input high speed electrical signal, there is known a Mach-Zehnder modulator that has a transmission line type electrode and has a termination resistor at an end of the electrode, the termination resistor being terminated with a resistance equal to characteristic impedance of the electrode. For example, there are disclosed a LiNbO$_3$ type Mach-Zehnder modulator that has a transmission line type electrode on an arm and a micro strip substrate that divides one input signal to a plurality of paths and has a driver amplifier on each path (for example, see U.S. Pat. No. 6,937,790). The driver amplifier inputs a voltage signal to one end of each transmission line type electrode of the modulator. The other end of each transmission line type electrode is coupled to each termination resistor having a resistance equal to characteristic impedance of the transmission line type electrode.

SUMMARY

In a case where a signal line is branched three times into signal lines on a micro strip substrate, when input impedance of a signal fed into the micro strip substrate is, for example, 50Ω (ohms), it is necessary to enlarge characteristic impedance of the branched signal lines to 100Ω, 200Ω and 400Ω in order to achieve impedance matching. However, it is difficult to form signal lines that have characteristic impedance greatly different from each other, on a single micro strip substrate. The width of the signal line may be reduced in order to increase characteristic impedance, but the accuracy of the characteristic impedance of a narrow width signal line may be degraded because of a limitation of forming accuracy of the width. Thereby, there is variability in propagation loss and propagation time of an electrical signal transmitted in the signal line. It is therefore difficult to design signal lines from the branching point to driver amplifiers. That is, high adjustment accuracy of impedance and propagation time of the signal line is not achieved. And, the electrical signal transmitted to a Mach-Zehnder modulator through the signal line is disturbed. As a result, a sufficient modulation amplitude of an optical signal to be modulated by the Mach-Zehnder modulator is not achieved, and an optical modulation efficiency may be degraded.

According to an aspect of the present invention, there is provided an optical modulation device including: a Mach-Zehnder modulator that includes a mesa-shaped semiconductor waveguide formed on a substrate; a plurality of phase modulators of transmission line type that are spaced from each other along the semiconductor waveguide of the Mach-Zehnder modulator; a first amplifier that is coupled with an input transmission line transmitting an electrical signal, has an input impedance substantially equal to a characteristic impedance of the input transmission line, and amplifies the electrical signal; a first interconnection that is coupled to the first amplifier and transmits the electrical signal to a first end of one of the plurality of phase modulators that is provided on an input side of the Mach-Zehnder modulator; a second interconnection that is coupled to the first amplifier and transmits the electrical signal to a first end of the other of the plurality of phase modulators that is provided on an output side of the Mach-Zehnder modulator; and a plurality of termination resistors that are respectively coupled to second ends of the plurality of phase modulators.

BRIEF DESCRIPTION OF THE DRAWINGS

FIG. 2 illustrates a plan view of an optical waveguide structure of a semiconductor Mach-Zehnder modulator formed in a modulator chip;

DETAILED DESCRIPTION

Figure 1A:
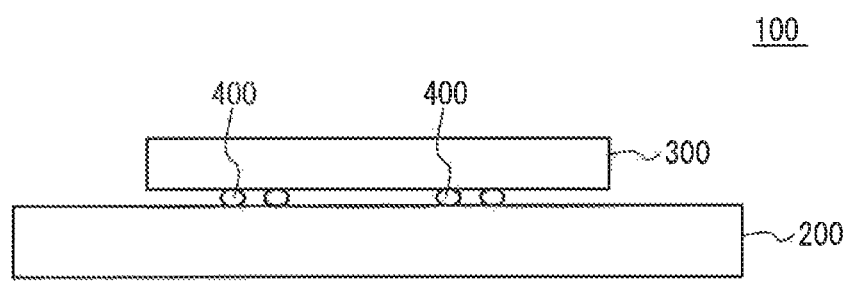
FIG. 1A and FIG. 1B illustrate a schematic side views of an optical modulation device in accordance with a first embodiment.

Description of Embodiments of the Present Invention

First of all, the contents of embodiments of the present invention will be listed and described.

The present invention is an optical modulation device including: a Mach-Zehnder modulator that includes a mesa-shaped semiconductor waveguide formed on a substrate; a plurality of phase modulators of transmission line type that are spaced from each other along the semiconductor waveguide of the Mach-Zehnder modulator; a first amplifier that is coupled with an input transmission line transmitting an electrical signal, has an input impedance substantially equal to a characteristic impedance of the input transmission line, and amplifies the electrical signal; a first interconnection that is coupled to the first amplifier and transmits the electrical signal to a first end of one of the plurality of phase modulators that is provided on an input side of the Mach-Zehnder modulator; a second interconnection that is coupled to the first amplifier and transmits the electrical signal to a first end of the other of the plurality of phase modulators that is provided on an output side of the Mach-Zehnder modulator; and a plurality of termination resistors that are respectively coupled to second ends of the plurality of phase modulators. With the structure, high adjustment accuracy of impedance and a propagation time of a signal line can be achieved and a preferable optical modulation efficiency can be achieved.

The first amplifier may have an output impedance smaller than the input impedance.

The optical modulation device may include a branch circuit that is coupled with the first amplifier, divides the electrical signal into a plurality of electrical signals, and transmits two of the plurality of the electrical signals to the first and second interconnections.

The second interconnection may have a longer length than that of the first interconnection so that the electrical signal transmitted in the second interconnection has a propagation time longer than that in the first interconnection.

The semiconductor waveguide may include a Si waveguide. When the arm is a part of the semiconductor waveguide of which main component is Si, a problem of modulation amplitude reduction of an optical signal to be modulated on a high frequency side is remarkable. However, a plurality of phase modulators are provided. It is therefore possible to compensate for attenuation of a voltage signal by overlapping phase changing. And it is possible to suppress the reduction of the modulation amplitude of the optical signal to be modulated, and achieve a preferable optical modulation efficiency.

The semiconductor waveguide may have a pn junction. The plurality of phase modulators may have a transmission line electrode and a reference potential electrode, the transmission line electrode being coupled with the first interconnection or the second interconnection. The transmission line electrode may be electrically coupled with one side of the pn junction. The reference potential electrode may be electrically coupled with the other side of the pn junction. In this case, in a structure having a problem that modulation amplitude reduction of an optical signal to be modulated on a high frequency side is remarkable, it is possible to compensate for attenuation of a voltage signal by overlapping phase changing. And it is possible to suppress the reduction of the modulation amplitude of the optical signal to be modulated, and maintain high optical modulation efficiency.

The semiconductor waveguide may have a semiconductor/insulator/semiconductor structure. The plurality of phase modulators may have a transmission line electrode and a reference potential electrode, the transmission line electrode being coupled with the first interconnection or the second interconnection. The transmission line electrode may be electrically coupled with one side of the semiconductor/insulator/semiconductor structure. The reference potential electrode may be electrically coupled with the other side of the semiconductor/insulator/semiconductor structure. In this case, in a structure having a problem that modulation amplitude reduction of an optical signal to be modulated on a high frequency side is remarkable, it is possible to compensate for attenuation of a voltage signal by overlapping phase changing. And it is possible to suppress the reduction of the modulation amplitude of the optical signal to be modulated, and maintain high optical modulation efficiency.

Each of the plurality of phase modulators may have a pair of transmission line electrodes. The first interconnection may have a first differential amplifier that amplifies the electrical signal output from the first amplifier, produces a pair of differential signals, and transmits the pair of differential signals to the pair of transmission line electrodes of the phase modulator on the input side of the Mach-Zehnder modulator. The second interconnection may have a second differential amplifier that amplifies the electrical signal output from the first amplifier, produces a pair of differential signals, and transmits the pair of differential signals to the pair of transmission line electrodes of the phase modulator on the output side of the Mach-Zehnder modulator. The phase modulator of transmission line type can achieve high speed operation even if each electrode is elongated, compared to a lumped constant type phase modulator. It is therefore possible to achieve high optical modulation efficiency at high speed operation with less number of differential output amplifiers.

The optical modulation device may further include: a second amplifier that is provided between the first differential output amplifier and the first amplifier, in the first interconnection; and a third amplifier that is provided between the second differential output amplifier and the first amplifier, in the second interconnection. With the structure, it is possible to suppress influence of returning component of a reflection wave on the first amplifier.

Output voltages of the first differential output amplifier and the second differential output amplifier may substantially linearly vary in a whole range of amplitude of an output voltage of the first amplifier. With the structure, it is possible to achieve high quality signal transmission.

An output voltage of the first differential output amplifier may substantially linearly vary in a whole range of amplitude of an output voltage of the second amplifier. An output voltage of the second differential output amplifier may substantially linearly vary in a whole range of amplitude of an output voltage of the third amplifier. With the structure, it is possible to achieve high quality signal transmission.

The Mach-Zehnder modulator and the plurality of phase modulators may be provided in a modulator chip. The first amplifier, the first interconnection and the second interconnection may be provided in a driver chip. The modulator chip may be coupled with the driver chip through a bump. With the structure, it is not necessary to use a bonding wire.

The second interconnection may delay the output of the first amplifier more than the first interconnection and may input, after delaying, the output into a transmission line electrode of one of the plurality of phase modulators on an output side of the Mach-Zehnder modulator. With the structure, it is possible to suppress influence of propagation delay of a light in the Mach-Zehnder modulator.

At least one of the first interconnection and the second interconnection may have a variable capacitance diode so as to adjust a propagation time of an electrical signal. With the structure, it is possible to adjust a delay amount.

The input electrical signal may include a multivalued modulation component. When the electrical signal including the multivalued modulation component is used, it is possible to achieve desirable modulation amplitude of an optical signal to be modulated.

DETAILS OF EMBODIMENTS OF THE PRESENT INVENTION

A description will be given embodiments of optical modulation devices of embodiments of the present invention, with drawings. The present invention is not limited to the specifically disclosed embodiments and variations but may include other embodiments and variations without departing from the scope of the present invention.

First Embodiment

Figure 1B:
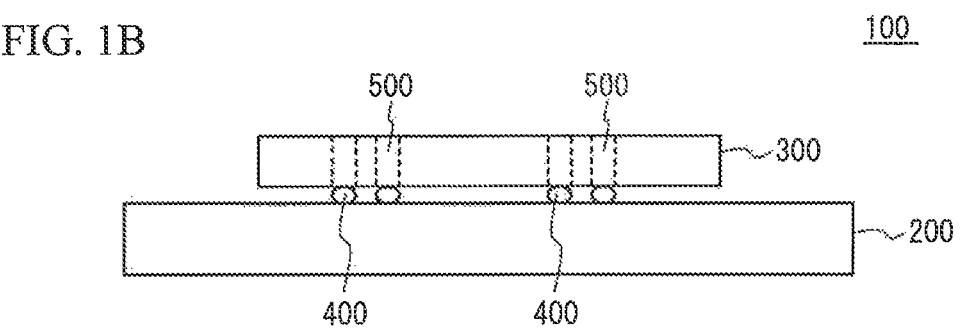

FIG. 1A and FIG. 1B illustrate a schematic side views of an optical modulation device 100 in accordance with a first embodiment. As illustrated in FIG. 1A, the optical modulation device 100 has a structure in which a driver chip 300 is mounted on an upper face of a modulator chip 200 through a bump 400. In FIG. 1A, the upper face of the modulator chip 200 is a face for forming elements. A lower face of the driver chip 300 (a face facing the modulator chip 200) is a face for forming elements. The face for forming elements of the modulator chip 200 is electrically coupled with the face for forming elements of the driver chip 300 via the bump 400. When the face for forming elements of the driver chip 300 is opposite to the modulator chip 200, a through-hole conductive via 500 may be formed in the driver chip 300, as illustrated in FIG. 1B. The face for forming elements of the modulator chip 200 is electrically coupled with the face for forming elements of the driver chip 300 via the bump 400 and the through-hole conductive via 500. When the bump 400 is used as illustrated in FIG. 1A or FIG. 1B, it is not necessary to use a wire bonding. Thus, adjustment accuracy of a propagation time of an electrical signal between interconnections is improved in the electrical connection between the modulator chip 200 and the driver chip 300.

FIG. 2 illustrates a plan view of an optical waveguide structure of a semiconductor Mach-Zehnder modulator 10 formed in the modulator chip 200. As illustrated in FIG. 2, the optical waveguide structure has an input waveguide 11, an optical coupler 12, two arm waveguides 13a and 13b, an optical coupler 14 and an output waveguide 15, on a substrate. The input waveguide 11, the optical coupler 12, the two arm waveguides 13a and 13b, the optical coupler 14 and the output waveguide 15 are a mesa-shaped optical waveguide. The optical couplers 12 and 14 are optical couplers of directional coupler type.

The optical coupler 12 branches a light that is input from the input waveguide 11. The two arm waveguides 13a and 13b propagate the lights branched by the optical coupler 12. The optical coupler 14 multiplexes the lights propagated through the two arm waveguides 13a and 13b. The light multiplexed by the optical coupler 14 is output from the output waveguide 15.

Figure 3:
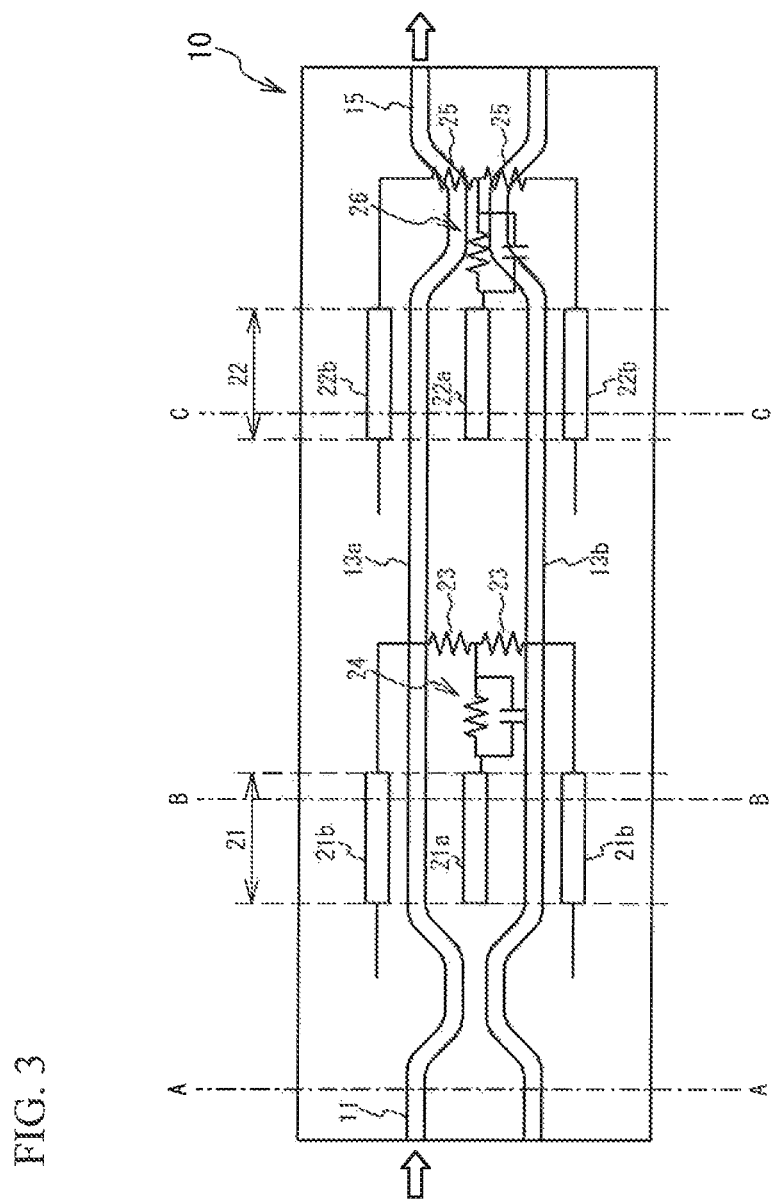
FIG. 3 illustrates an overlapped view of FIG. 2 and an electrical circuit of a semiconductor Mach-Zehnder modulator.

FIG. 3 illustrates an overlapped view of FIG. 2 and an electrical circuit for applying electrical signals to the semiconductor Mach-Zehnder modulator 10. As illustrated in FIG. 3, the electrical circuit includes phase modulators 21 and 22, termination resistors 23 and 25 and termination circuits 24 and 26. The phase modulators 21 and 22 are provided on a single substrate in common with the optical waveguide structure (in the modulator chip 200). The phase modulators 21 and 22 are formed along the arm waveguides 13a and 13b. The phase modulators 21 and 22 are spaced from each other in an extension direction of the arm waveguides 13a and 13b. The phase modulators 21 and 22 have a transmission line type structure. For example, the phase modulators 21 and 22 have a micro strip line as the transmission line. The phase modulator 21 of the phase modulators is provided on an input side of the semiconductor Mach-Zehnder modulator 10, that is, on a side closer to the input waveguide 11. The phase modulator 22 of the phase modulators is provided on an output side of the semiconductor Mach-Zehnder modulator 10, that is, on a side closer to the output waveguide 15.

The phase modulator 21 has a reference potential electrode 21a and two transmission line electrodes 21b. The reference potential electrode 21a is provided between the arm waveguide 13a and the arm waveguide 13b. The two transmission line electrodes 21b are provided so as to sandwich the arm waveguide 13a with the reference potential electrode 21a and sandwich the arm waveguide 13b with the reference potential electrode 21a. The reference potential electrode 21a and the two transmission line electrodes 21b extend in parallel with each other. Moreover, the reference potential electrode 21a and the two transmission line electrodes 21b are in parallel with the arm waveguide 13a and the arm waveguide 13b. The phase modulator 22 has a reference potential electrode 22a and two transmission line electrodes 22b. The reference potential electrode 22a is provided between the arm waveguide 13a and the arm waveguide 13b. The two transmission line electrodes 22b are provided so as to sandwich the arm waveguide 13a with the reference potential electrode 22a and sandwich the arm waveguide 13b with the reference potential electrode 22a. The reference potential electrode 22a and the two transmission line electrodes 22b are in parallel with each other. Moreover, the reference potential electrode 22a and the two transmission line electrodes 22b extend in parallel with the arm waveguide 13a and the arm waveguide 13b. The reference potential electrode 21a is spaced from the reference potential electrode 22a in the extension direction of the arm waveguides 13a and 13b. The transmission line electrodes 21b are spaced from the transmission line electrodes 22b in the extension direction of the arm waveguides 13a and 13b.

First ends of the transmission line electrodes 21b and 22b (on the input waveguide 11 side in FIG. 3) are coupled with an amplifier (driver amplifier) via a signal line, as described later. Second ends of the transmission line electrodes 21b (on the output waveguide 15 side in FIG. 3) is coupled with a first end of the termination circuit 24 via termination resistors 23. Second ends of the transmission line electrodes 22b (on the output waveguide 15 side in FIG. 3) are coupled with a first end of the termination circuit 26 via termination resistors 25. The termination circuits 24 and 26 have a structure in which an electrical resistor and a capacitor are coupled in parallel. The capacitor is, for example, an MIM (Metal Insulator Metal) capacitor. A second end of the termination circuit 24 is coupled with a first end of the reference potential electrode 21a. A second end of the termination circuit 26 is coupled with a first end of the reference potential electrode 22a. Second ends of the reference potential electrodes 21a and 22a are coupled with a direct current voltage supply for bias described layer.

Figure 4A:
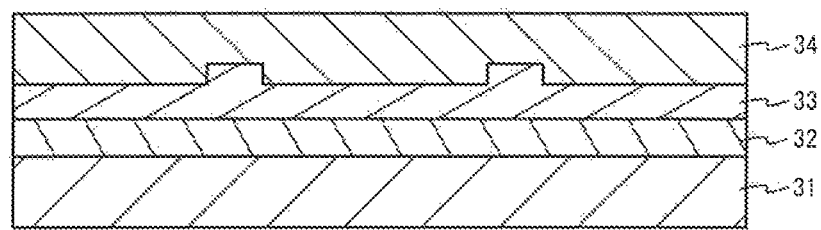
FIG. 4A illustrates a cross sectional view taken along a line A-A of FIG. 3.
Figure 4B:
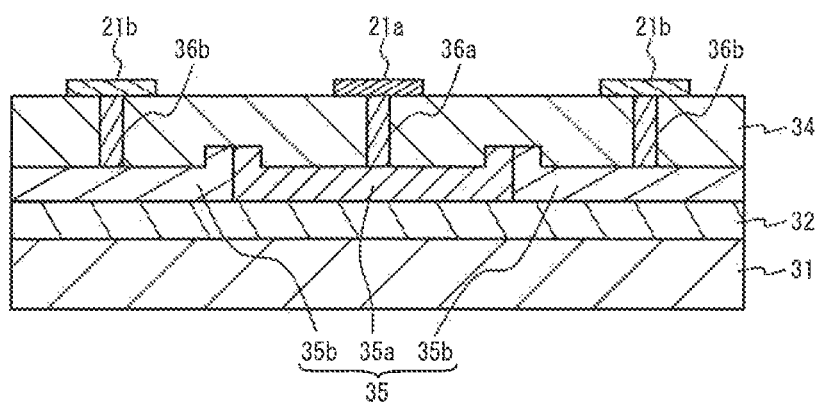
FIG. 4B illustrates a cross sectional view taken along a line B-B of FIG. 3.

FIG. 4A illustrates a cross sectional view taken along a line A-A of FIG. 3. FIG. 4B illustrates a cross sectional view taken along a line B-B of FIG. 3. As illustrated in FIG. 4A, a portion of the semiconductor Mach-Zehnder modulator 10 in which the phase modulator is not formed has a structure in which a $SiO_2$ (silicon dioxide) layer 32, a Si (silicon) layer 33 and a $SiO_2$ (silicon dioxide) layer 34 are formed on a Si (silicon) substrate 31. A mesa-shaped ridge (portion projected toward upper face) formed in the Si (silicon) layer 33 acts as an optical waveguide.

As illustrated in FIG. 4B, another portion of the semiconductor Mach-Zehnder modulator 10 including the phase modulator has a structure in which the $SiO_2$ layer 32, a pn junction layer 35 and the $SiO_2$ layer 34 are formed on the Si substrate 31. The pn junction layer 35 includes an n-doped region 35a, a p-doped region 35b and a pn joint portion in which the n-doped region 35a is jointed with the p-doped region 35b. The n-doped region 35a is formed under the reference potential electrode 21a (N-electrode). The n-doped region 35a is coupled with the reference potential electrode 21a (N-electrode) via a metal contact via 36a. Two p-doped regions 35b are formed under each transmission line electrode 21b (P-electrode). The p-doped region 35b is coupled with the transmission line electrode 21b (P-electrode) via a metal contact via 36b. The n-doped region 35a forms p-n junction with the p-doped region 35b in a center portion of the ridge formed in the pn junction layer 35. The reference potential electrodes 21a and 22a, the transmission line electrodes 21b and 22b and the metal contact via 36a and 36b are made of metal (aluminum, tungsten or the like).

When a voltage is applied between the reference potential electrode 21a (N-electrode) and the transmission line electrodes 21b (P-electrode), a voltage is applied to the pn junction portion through the n-doped region 35a and the p-doped region 35b. The applying of the voltage changes the density of the conductive carriers existing in the pn junction portion. Thus, an effective refraction index of the optical waveguide is varied, and a phase of a light propagating in the optical waveguide is varied. Therefore, a phase difference occurs between a light in the arm waveguide 13a and a light in the arm waveguide 13b during propagation of the lights in the two arm waveguides 13a and 13b, when an electrical signal (voltage) is applied to the phase modulator. When the two lights are multiplexed by the optical coupler 14 on the output side, it is possible to select a condition that a continuous light input from the input waveguide 11 is introduced to one of the output waveguides 15 or a condition that the continuous light is introduced to the other of the output waveguides 15, on the basis of a value of the phase difference from zero to π. Thus, an optical modulation output corresponding to the electrical signal is extracted to the output waveguide 15.

A cross section taken along a line C-C of FIG. 3 also has the same multilayer structure as the cross section taken along a line B-B of FIG. 3. That is, in the phase modulator 22, the arm waveguides 13a and 13b have the pn junction portion. A cross section of the arm waveguides 13a and 13b between the phase modulators 21 and 22 spaced from each other has the same structure as FIG. 4A.

Figure 5:
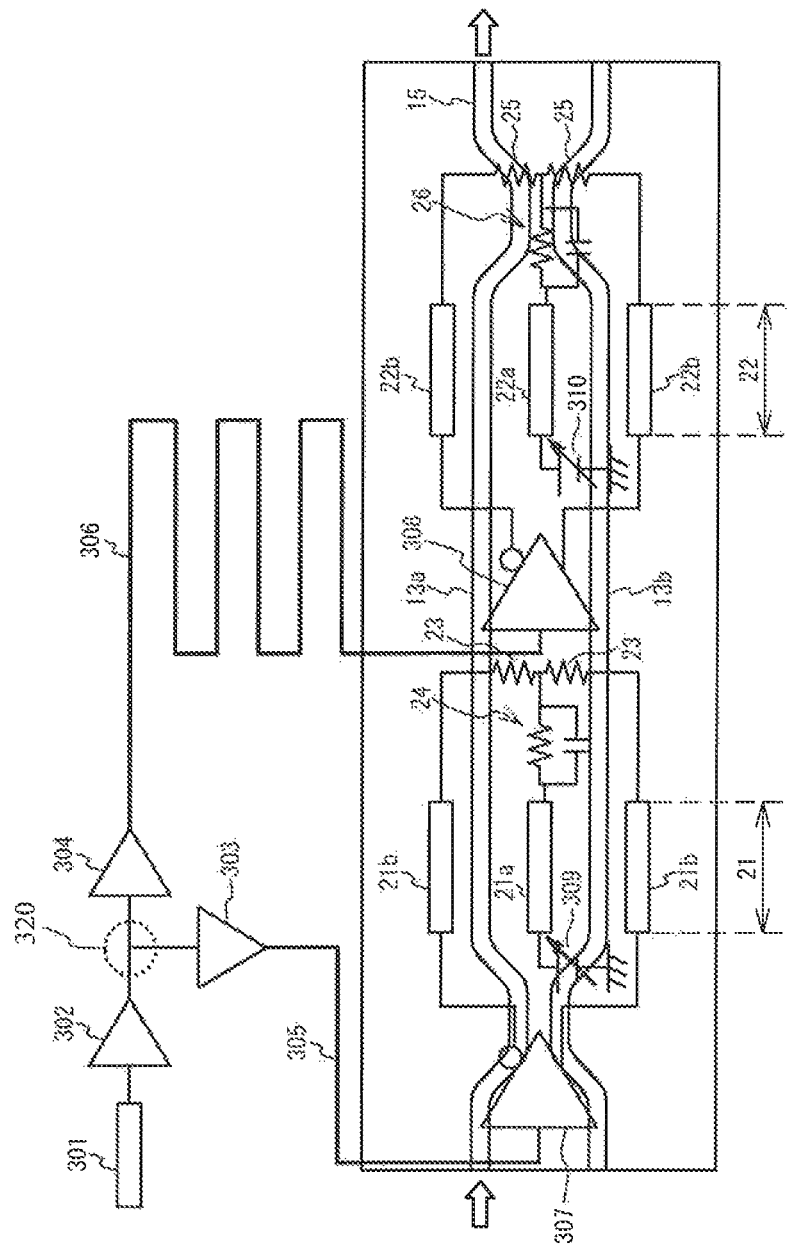
FIG. 5 illustrates an overlapped view of an electrical circuit portion of a driver chip and FIG. 3.

FIG. 5 illustrates an overlapped view of the electrical circuit portion of the driver chip 300 and FIG. 3. As illustrated in FIG. 5, the driver chip 300 has an input signal transmission line 301, a first amplifier 302, a second amplifier 303, a third amplifier 304, a first signal transmission line 305, a second signal transmission line 306, a first differential output amplifier 307, a second differential output amplifier 308, a branch circuit 320, and a direct current voltage sources 309 and 310 for bias.

Figure 6:
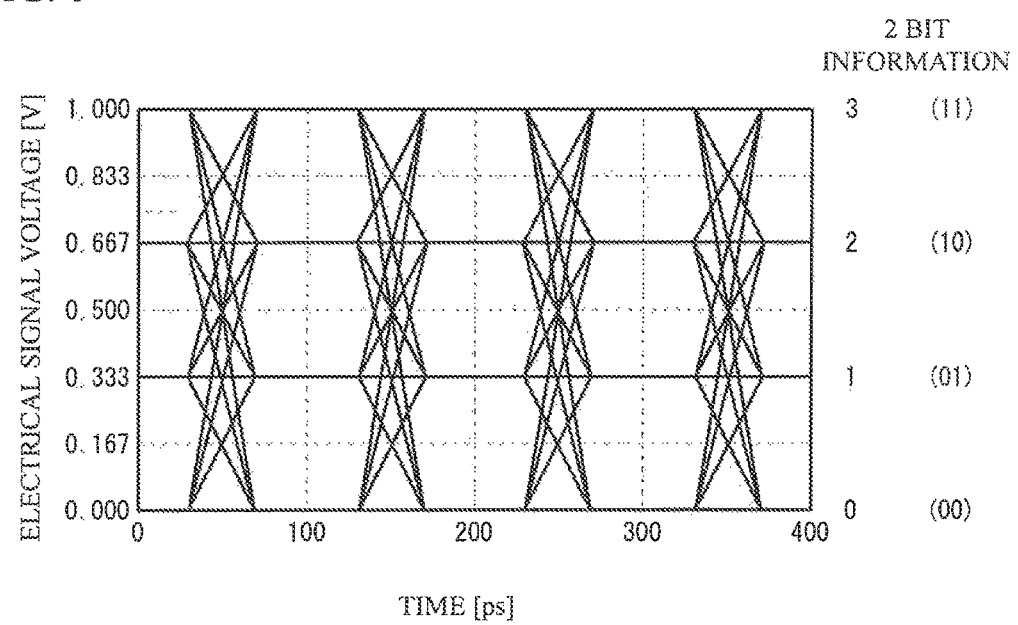
FIG. 6 illustrates an electrical signal input into an input signal transmission line.

FIG. 6 illustrates an electrical signal input into the input signal transmission line 301. As one example, a PAM (Pulse-Amplitude Modulation) electrical signal is used as the electrical signal. The PAM electrical signal is a pulse-amplitude modulated electrical signal. In the example of FIG. 6, the amplitude of the electrical signal is classified into four values of 0V, 0.333V, 0.667V and 1V with respect to each symbol. When the four values of the amplitude are used, 2 bit information is achieved.

The first amplifier 302 amplifies the PAM electrical signal received from the input signal transmission line 301. The amplified PAM electrical signal is output from the first amplifier 302, and after that, is branched by a short transmission line. Output impedance of the first amplifier 302 is set, for example, to a value obtained by dividing characteristic impedance of the input signal transmission line 301 by "N". In the example of FIG. 5, the output impedance of the first amplifier 302 is 25Ω (ohms). "N" is a ramification number and coincides with the number of the phase modulators provided along the arm waveguides 13a and 13b. In the embodiment, "N" is 2, as an example. The signal transmission line after the first amplifier 302 is branched into two lines. One is coupled with the second amplifier 303. The other is coupled with the third amplifier 304.

It is possible to provide the first amplifier 302, the second amplifier 303, the third amplifier 304, and the branch circuit 320 in a single electrical circuit. The first amplifier 302 is coupled with an impedance-matched short connection line of the branch circuit 320. The branch circuit 320 has two branch lines divided from the short connection line. When the output impedance of the first amplifier 302 is 25Ω, the impedance of the short connection line is 25Ω, and the impedance of the each branch line becomes 50Ω. The second amplifier 303 and the third amplifier 304 are respectively coupled with branch lines. Input impedance of the first amplifier 302 is equal to the characteristic impedance of the input signal transmission line 301, and is 50Ω, as an example. Output impedance of the first amplifier 302 is, for example, 25Ω. For example, the first amplifier 302 doubles the voltage of the electrical signal input from the input signal transmission line 301. Input impedance of the second amplifier 303 and the third amplifier 304 is, for example, 50Ω. Output impedance of the second amplifier 303 and the third amplifier 304 is, for example, 50Ω. For example, the second amplifier 303 and the third amplifier 304 double the voltage of the electrical signal input from the first amplifier 302.

The function of the second amplifier 303 and the third amplifier 304 is as follows. When matching between the output impedance of the first amplifier 302, the second amplifier 303 and the third amplifier 304 and impedance of downstream side circuit (the first signal transmission line 305, the second signal transmission line 306, the first differential output amplifier 307 and the second differential output amplifier 308) is bad, a reflection wave of an electrical signal may return from the downstream circuits to the first amplifier 302, the second amplifier 303 and the third amplifier 304. Generally, the reflection wave has a bad influence on the operation of the amplifier. However, when the second amplifier 303 and the third amplifier 304 are provided after branching, the two amplifiers attenuate the intensity of the reflection wave. Therefore, the bad influence on the first amplifier 302 is suppressed. When the output impedance of the first amplifier 302 is completely matched with the impedance of the downstream side circuit with respect to the output of the first amplifier 302, the two amplifiers (the second amplifier 303 and the third amplifier 304) may be omitted.

The first interconnection electrically couples the first amplifier 302 with the phase modulator 21. The first interconnection includes the first signal transmission line 305, the second amplifier 303 and the first differential output amplifier 307. The first signal transmission line 305 couples the second amplifier 303 with the first differential output amplifier 307. The first differential output amplifier 307 amplifies the electrical signal and inputs an obtained differential output signals to the two transmission line electrodes 21b. The second interconnection electrically couples the first amplifier 302 with the phase modulator 22. The second interconnection includes the second signal transmission line 306, the third amplifier 304 and the second differential output amplifier 308. The second signal transmission line 306 couples the third amplifier 304 with the second differential output amplifier 308. The second differential output amplifier 308 amplifiers the electrical signal and inputs an obtained differential output signals to the two transmission line electrodes 22b.

Characteristic impedance of the first signal transmission line 305 and the second signal transmission line 306 is 50Ω. The first signal transmission line 305 has substantially the same width as the second signal transmission line 306. The first signal transmission line 305 has a different length from that of the second signal transmission line 306. When there is a difference between the lengths, there is a difference between a traveling time of the electrical signal from the first amplifier 302 to the first differential output amplifier 307 and a traveling time of the electrical signal from the first amplifier 302 to the second differential output amplifier 308. In concrete, when the differential output amplifier coupled to the signal transmission line is coupled with one of the plurality of phase modulators closer to the output waveguide 15, the length of the signal transmission path is elongated so that the traveling time from the first amplifier 302 to the one of the plurality of phase modulators is elongated.

In the embodiment, the lengths of the first signal transmission line 305 and the second signal transmission line 306 are adjusted so that a time τ2 needed for an electrical signal to travel from the first amplifier 302 to the transmission line electrode 22b is longer than a time τ1 needed for the electrical signal to travel from the first amplifier 302 to the transmission line electrode 21b. For example, when a transmission line length from the first differential output amplifier 307 to the transmission line electrode 21b coincides with a transmission line length from the second differential output amplifier 308 to the transmission line electrode 22b, the second signal transmission line 306 is longer than the first signal transmission line 305. It is preferable that the lengths of the first signal transmission line 305 and the second signal transmission line 306 are adjusted so that the time τ2 is longer than the time τ1 by a time needed for a light to propagate from points, to which a light is input, of portions of the arm waveguides 13a and 13b corresponding to the transmission line electrode 21b to points, to which a light is input, of portions of the arm waveguides 13a and 13b corresponding to the transmission line electrode 22b. For example, it is possible to adjust the length of the second signal transmission line 306 by forming the second signal transmission line 306 into a meandering shape. For example, when a difference between the time τ2 and the time τ1 is approximately 4 ps (picoseconds), a difference between the lengths of the first signal transmission line 305 and the second signal transmission line 306 may be approximately 0.6 mm.

Input impedance of the first differential output amplifier 307 and the second differential output amplifier 308 is 50Ω. Output impedance of the first differential output amplifier 307 and the second differential output amplifier 308 is 35Ω×2. A resistance of the termination resistor 23 is adjusted so as to coincide with the impedance of the phase modulator 21. A resistance of the termination resistor 25 is adjusted so as to coincide with the impedance of the phase modulator 22. In the embodiment, the resistance of the termination resistors 23 and 25 is 35Ω. The termination resistors 23 and 25 and the termination circuits 24 and 26 may be provided in the driver chip 300.

The direct current voltage source 309 for bias applies a direct current bias voltage to the reference potential electrode 21a so that an operation point of the phase modulator 21 of the semiconductor Mach-Zehnder modulator 10 is maintained at an adequate point. The direct current voltage source 310 for bias applies a direct current bias voltage to the reference potential electrode 22a so that an operation point of the phase modulator 22 of the semiconductor Mach-Zehnder modulator 10 is maintained at an adequate point. The termination circuit 24 maintains both the applying of the direct current bias voltage and the high frequency equilibrium of the termination resistor 23. The termination circuit 26 maintains both the applying of the direct current bias voltage and the high frequency equilibrium of the termination resistor 25.

The electrical signals input into the phase modulators 21 and 22 of transmission line type from the first differential output amplifier 307 and the second differential output amplifier 308 propagate on the phase modulators 21 and 22 with a group velocity determined by the structure of the phase modulators 21 and 22 and thereby apply voltages to each portion of the arm waveguides 13a and 13b extending in parallel with the phase modulators 21 and 22. The phase modulators 21 and 22 of transmission line type propagating the electrical signals are terminated by the termination resistors 23 and 25 with substantially no reflection. A phase changing amount by the phase modulator 21 during propagation of the light through the arm waveguides 13a and 13b along the phase modulator 21 from the input side is added to a phase changing amount by the phase modulator 22 during propagation of the light through the arm waveguides 13a and 13b along the phase modulator 22 until the output side.

Figure 7:
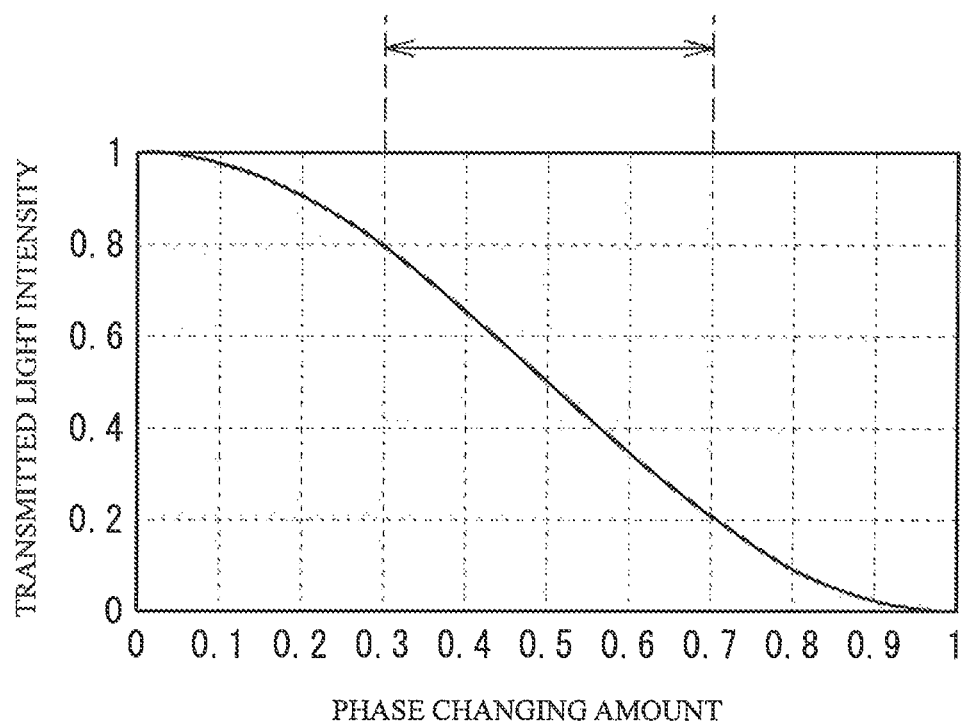
FIG. 7 illustrates a relationship between a phase changing amount and transmitted light intensity of a semiconductor Mach-Zehnder modulator.

FIG. 7 illustrates a relationship between the phase changing amount and transmitted light intensity of the semiconductor Mach-Zehnder modulator 10. The voltage applied to the phase modulators 21 and 22 by the electrical signals is approximately proportional to the phase changing amount of the light transmitting in the arm waveguides 13a and 13b. In order to achieve high quality signal transmission, it is preferable that the voltages applied to the phase modulators 21 and 22 have a linear relationship with the transmitted light intensity of the semiconductor Mach-Zehnder modulator 10. And so, it is preferable that the voltages applied to the phase modulators 21 and 22 (voltage of PAM electrical signal) is adjusted so that the phase difference between the two lights passing through the two arm waveguides 13a and 13b is within 0.3 to 0.7 in a horizontal axis of FIG. 7. The voltages applied to the phase modulators 21 and 22 is adjusted by adjusting an amplification factors of the first amplifier 302, the second amplifier 303, the third amplifier 304, the first differential output amplifier 307 and the second differential output amplifier 308. When the second amplifier 303 and the third amplifier 304 are omitted, the output voltages of the first differential output amplifier 307 and the second differential output amplifier 308 linearly operate the first amplifier 302 in the whole output voltage range of the first amplifier 302, in order to output the voltage maintaining the linear relationship between the applied voltage and the transmitted light intensity to the phase modulator. When the second amplifier 303 and the third amplifier 304 are used, it is preferable that the output voltages of the first differential output amplifier 307 and the second differential output amplifier 308 linearly operate the second amplifier 303 and the third amplifier 304 in the whole output voltage range of the second amplifier 303 and the third amplifier 304. It is preferable that the first amplifier 302, the second amplifier 303, the third amplifier 304, the first differential output amplifier 307 and the second differential output amplifier 308 are a linear amplifier.

Figure 8A:
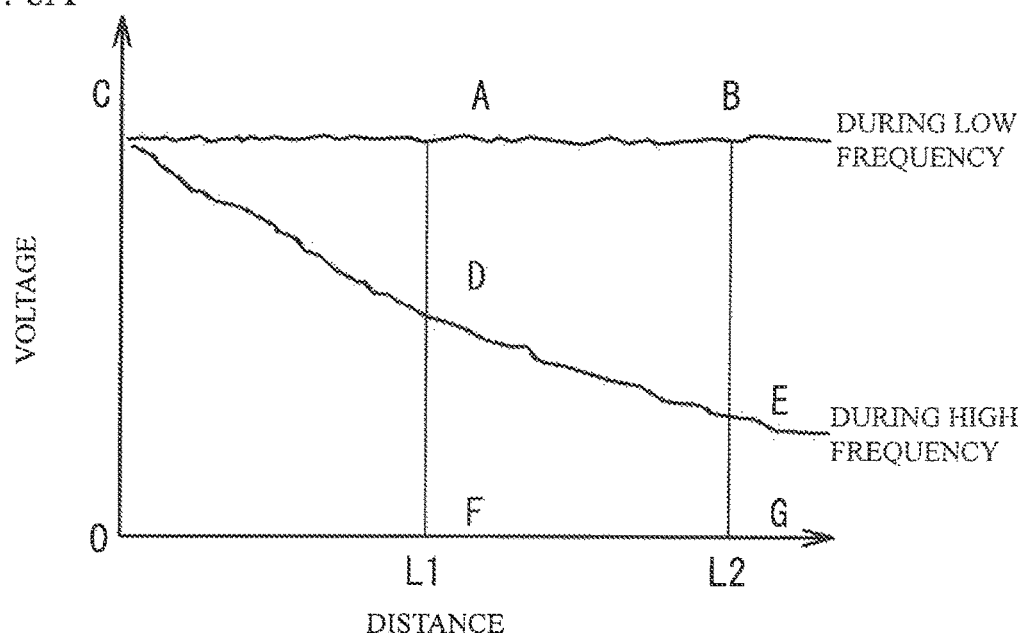
FIG. 8A illustrates attenuation of an electrical signal in a case where only one phase modulator is provided.
Figure 8B:
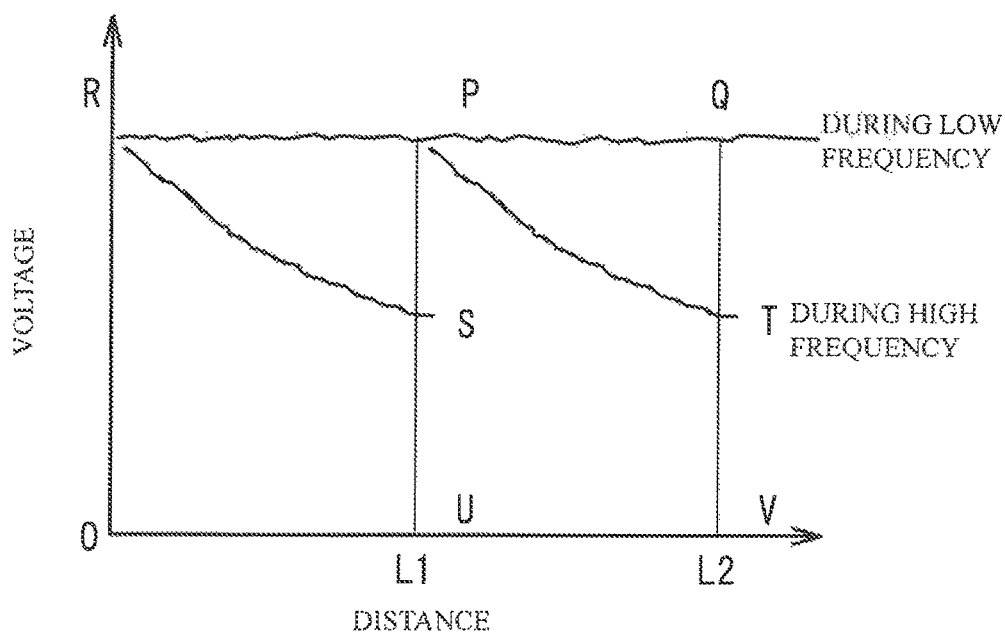
FIG. 8B illustrates attenuation of an electrical signal in a case where two phase modulators spaced from each other are provided.

FIG. 8A illustrates attenuation of an electrical signal in a case (comparative embodiment) where only one phase modulator is provided along a whole length of the arm waveguides 13a and 13b from the input side to the output side. FIG. 8B illustrates attenuation of an electrical signal in a case where two phase modulators spaced from each other are provided on the input side and on the output side of the arm waveguides 13a and 13b, as in the case of the embodiment. In FIG. 8A and FIG. 8B, a horizontal axis indicates a distance (length) of the phase modulator in the extension direction of the arm waveguides 13a and 13b. A vertical axis indicates a voltage applied to the arm waveguide from the phase modulator. In the example of FIG. 8A, a phase modulator having a length of L2 is used. In the example of FIG. 8B, two phase modulators having a length of L1=L2/2 are used. That is, a total length of FIG. 8A is the same as that of FIG. 8B.

As illustrated in FIG. 8A and FIG. 8B, a low frequency electrical signal (during low frequency) hardly attenuates during propagation in the phase modulator of a transmission line type. However, voltage amplitude of a high frequency electrical signal (during high frequency) attenuates during propagation in the phase modulator of a transmission line type. A phase difference amount of the arm waveguide along the phase modulator is proportional to an action obtained by integrating the voltage of each portion of the phase modulator along the length of the phase modulator. Therefore, the action at the low frequency is proportional to an area of a rectangular CBGO. However, the action at the high frequency is reduced to an area CEGO. A ratio of the area CEGO to the area CBGO corresponds to the reduction amount of the modulation amplitude of an optical signal to be modulated. As reduction amount of the modulation amplitude of the optical signal to be modulated becomes smaller, the electrical efficiency of the modulation of the Mach-Zehnder modulator becomes better.

There is a method of halving the length of the phase modulator to L1 as a method of reducing the modulation amplitude reduction of the optical signal to be modulated. The action at the low frequency is proportional to the area of the rectangular CAFO. However, the action at the high frequency is reduced to the area CDFO. The ratio of the area CDFO to the area CAFO corresponds to the reduction amount of the modulation amplitude of the optical signal to be modulated. As illustrated in FIG. 8A, the area ratio is smaller than that in the case where the length of the phase modulator is L2.

However, in the structure in which the length of the phase modulator is halved, an absolute value of the phase difference amount (action) is not large. And so, when two lengths of L2/2 of the phase modulators are arrayed, both of large action and large modulation amplitude of the optical signal to be modulated at high frequency can be achieved. As apparent from the above mentioned principle, even if three or more phase modulators are arrayed, the above-mentioned effect can be achieved. In the embodiment, two phase modulators are arrayed. However, the structure in which three or more modulators are arrayed can be used.

Figure 9:
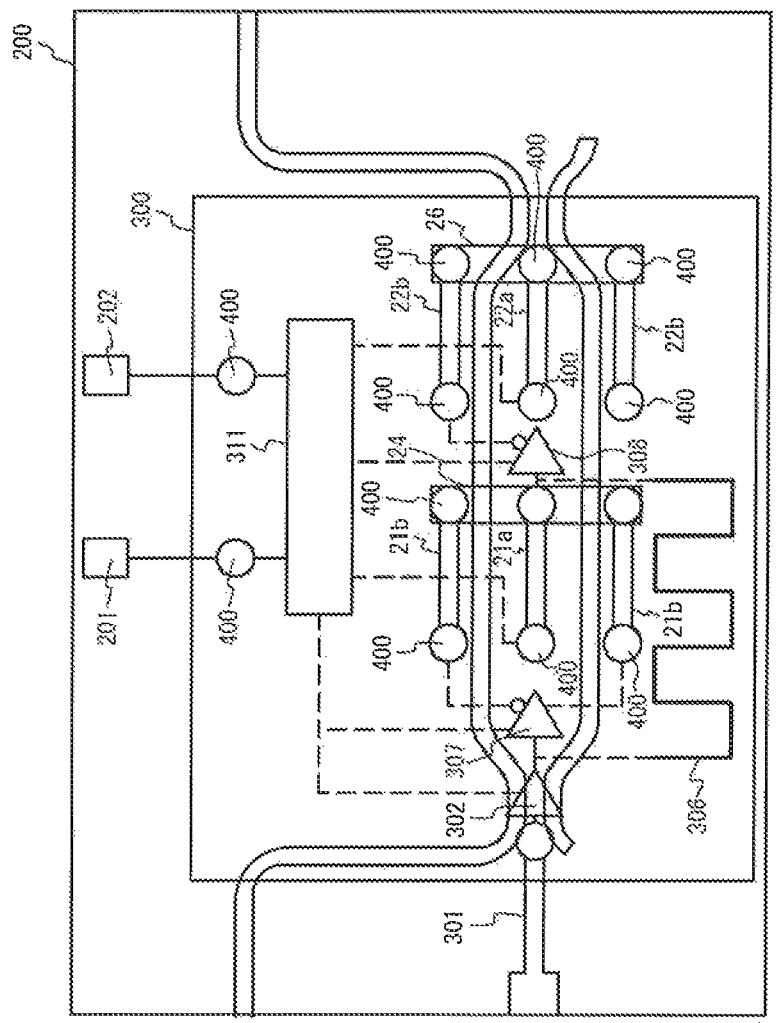
FIG. 9 illustrates an interconnection structure of a modulator chip and a driver chip.

FIG. 9 illustrates an interconnection structure of the modulator chip 200 and the driver chip 300. FIG. 9 illustrates a top view of a case where the driver chip 300 is mounted on the upper face of the modulator chip 200. As illustrated in FIG. 9, two electrode pads 201 and 202 are provided on the upper face of the modulator chip 200. The electrode pads 201 and 202 are coupled to an external electrical power supply. An electrical power supply circuit 311 is provided on the lower face of the driver chip 300. The electrode pads 201 and 202 are coupled with the electrical power supply circuit 311 via the interconnection and the bump 400 that are provided on the upper face of the modulator chip 200. The electrical power supply circuit 311 supplies electrical power to the first amplifier 302, the second amplifier 303, the third amplifier 304, the first differential output amplifier 307 and the second differential output amplifier 308 via the interconnection on the lower face of the driver chip 300. In FIG. 9, the second amplifier 303 and the third amplifier 304 are omitted. The first differential output amplifier 307 and the second differential output amplifier 308 are coupled with the transmission line electrodes 21b and 22b via the interconnection and the bump 400 that are provided on the upper face of the modulator chip 200. The reference potential electrodes 21a and 22a are coupled with the electrical power supply circuit 311 via the bump 400 and the interconnection on the lower face of the driver chip 300. The electrical power supply circuit 311 also acts as the direct current voltage sources 309 and 310 for bias illustrated in FIG. 5.

Figure 10A:
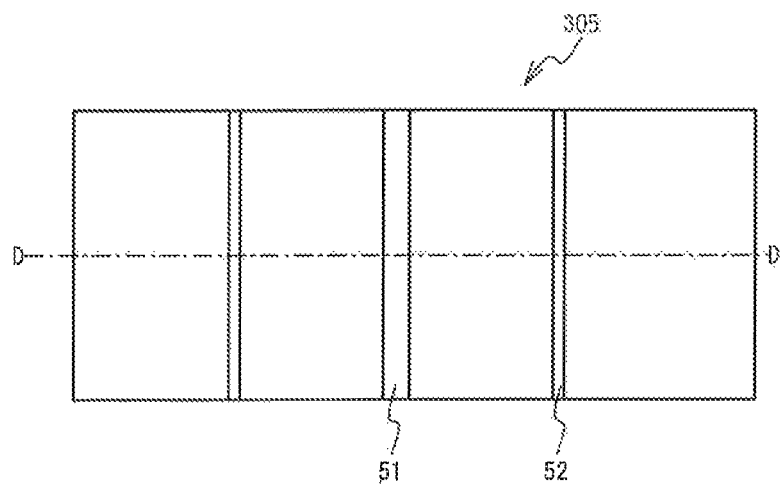
FIG. 10A and FIG. 10B illustrate a transmission line structure of a first signal transmission line of a driver chip.
Figure 10B:
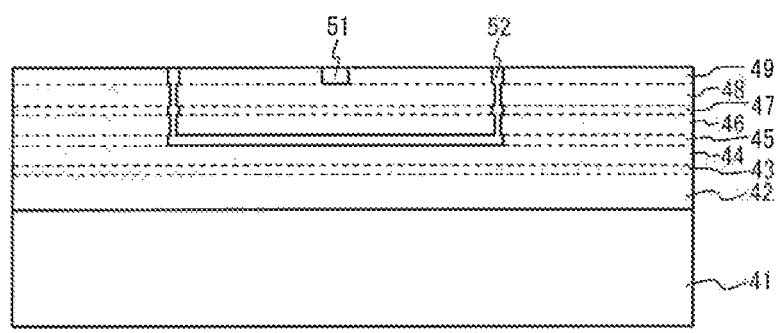

FIG. 10A and FIG. 10B illustrate a transmission line structure of the first signal transmission line 305 of the driver chip 300. FIG. 10A illustrates a plan view of the first signal transmission line 305. FIG. 10B illustrates a cross sectional view taken along a line D-D of FIG. 10A. As illustrated in FIG. 10A and FIG. 10B, the first signal transmission line 305 has a micro strip line structure. The second signal transmission line 306 also has the same structure as the first signal transmission path 305.

For example, the driver chip 300 has a structure in which a first insulation layer 42, a first interconnection layer 43, a second insulation layer 44, a second interconnection layer 45, a third insulation layer 46, a third interconnection layer 47, a fourth insulation layer 48, a fourth interconnection layer 49 are laminated on a semiconductor substrate 41. A transmission line 51 is formed in the fourth interconnection layer 49. A ground electrode 52 is formed in the second interconnection layer 45 and has a larger width than the transmission line 51. Both sides of the ground electrode 52 penetrate to the fourth interconnection layer 49 and are exposed at the fourth interconnection layer 49.

First Modified Embodiment

Figure 11A:
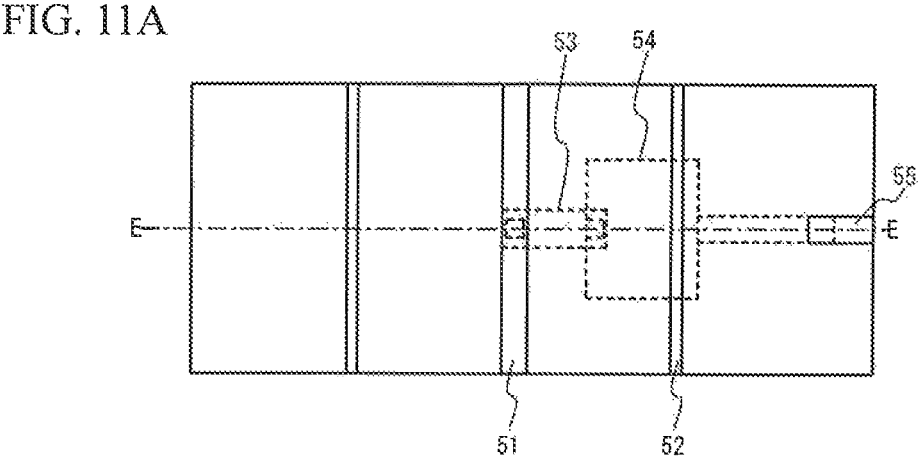
FIG. 11A and FIG. 11B illustrate another example of a signal transmission line.
Figure 11B:
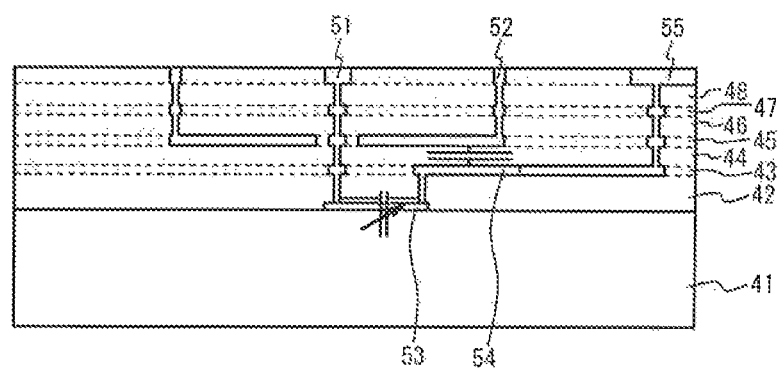

A delay amount may be adjusted by providing a variable capacitance diode in at least one of the first signal transmission line 305 and the second signal transmission line 306. FIG. 11A and FIG. 11B illustrate another example of the first signal transmission line 305 and the second signal transmission line 306. FIG. 11A illustrates a plan view of the first signal transmission line 305 and the second signal transmission line 306. FIG. 11B illustrates a cross sectional view taken along a line E-E of FIG. 11A. As illustrated in FIG. 11A and FIG. 11B, the ground electrode 52 has an opening below the transmission line 51. The transmission line 51 passes through the opening and penetrates the fourth insulation layer 48, the third interconnection layer 47, the third insulation layer 46, the second interconnection layer 45, the second insulation layer 44, the first interconnection layer 43 and the first insulation layer 42, and is coupled with an one end of the variable capacitance diode 53 on the semiconductor substrate 41. The other end of the variable capacitance diode 53 penetrates the first insulation layer 42 and is coupled with one end of a metal layer 54 formed in the first interconnection layer 43. A part of the metal layer 54 faces with the ground electrode 52 formed in the second interconnection layer 45 through the second insulation layer 44.

The structure in which the metal layer 54 faces with the ground electrode 52 acts as an MIM (Metal Insulator Metal) capacitor. The other end of the metal layer 54 penetrates the second insulation layer 44, the second interconnection layer 45, the third insulation layer 46, the third interconnection layer 47 and the fourth insulation layer 48 and is coupled with a metal layer 55 formed in the fourth interconnection layer 49. The metal layer 55 is coupled with a bias electrical power supply.

It is possible to adjust the capacitance of the variable capacitance diode 53 by changing the supply voltage of the bias electrical power supply. It is possible to change the capacitance between the transmission line 51 and the ground electrode 52 by changing the capacitance of the variable capacitance diode 53. Thereby, the delay amount of the propagation time of the transmission line can be changed.

The length of a delay time adjuster of one block illustrated in FIG. 11A is approximately 100 μm in the extension direction of the transmission line 51. When ten delay time adjusters are connected in series, a transmission line structure of micro strip line type having a length of approximately 1000 μm can be achieved.

The capacitance of each variable capacitance diode 53 is variable in a range from 7.5 fF (femto farad) to 15 fF. The capacitance of each MIM capacitor is 2.5 pF (pico frad). The capacitance of the MIM capacitor is larger than that of the variable capacitance diode 53 by two or three orders. Therefore, the capacitance changing by the variable capacitance diode 53 is approximately linearly added to the capacitance between the transmission line 51 and the ground electrode 52. Thus, the capacitance of the variable capacitance diode 53 is controlled. It is therefore possible to approximately linearly control the delay time of the electrical signal propagating in the delay time adjuster.

When the capacitance of each variable capacitance diode 53 is changed from 7.5 fF to 15 fF, the delay time of the electrical signal propagating in the transmission line of the delay time adjuster having the length of approximately 1000 μm varies within a range from 9 ps (pico seconds) to 12 ps.

Second Modified Embodiment

Figure 12:
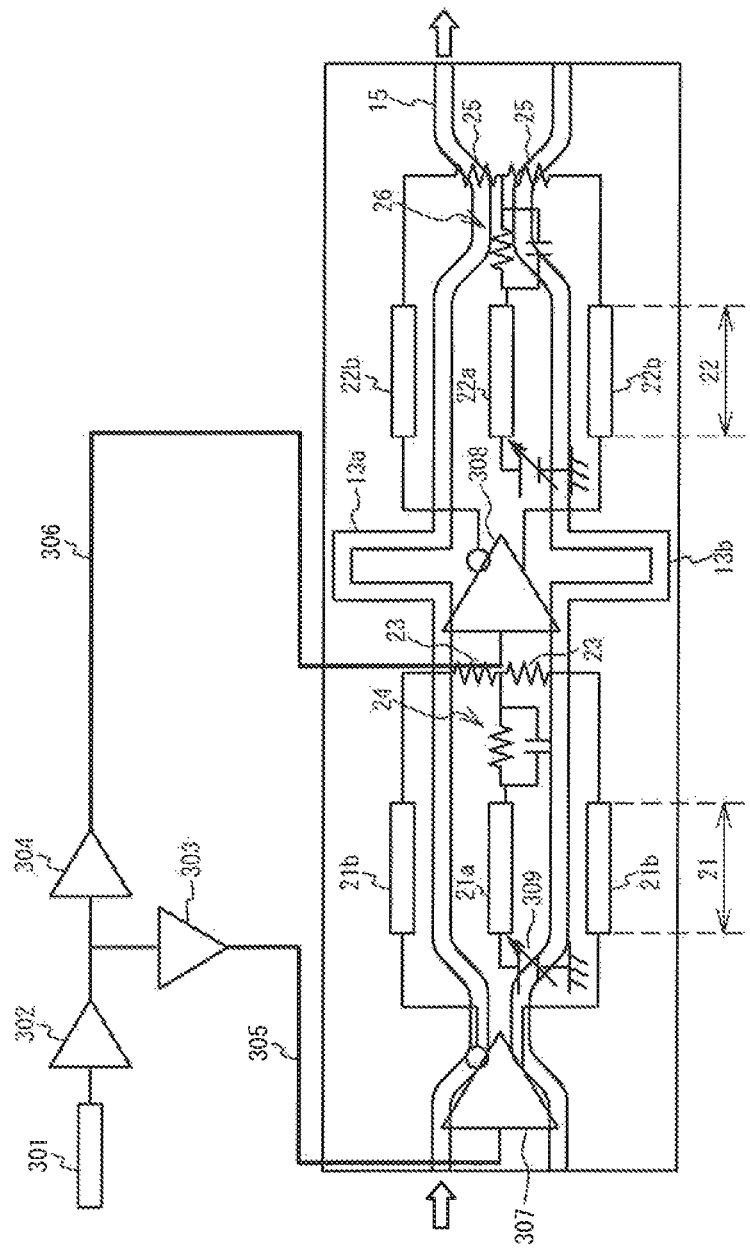
FIG. 12 illustrates a case where a delay is adjusted by a length of an arm waveguide.

When it is difficult to adjust delay matching between an optical signal and an electrical signal only by the first signal transmission line 305 and the second signal transmission line 306, the delay matching may be adjusted by changing the lengths of the arm waveguides 13a and 13b. For example, as illustrated in FIG. 12, the delay amount may be adjusted by providing a curved portion in the arm waveguides 13a and 13b between the phase modulator 21 and the phase modulator 22.

Third Modified Embodiment

Figure 13:
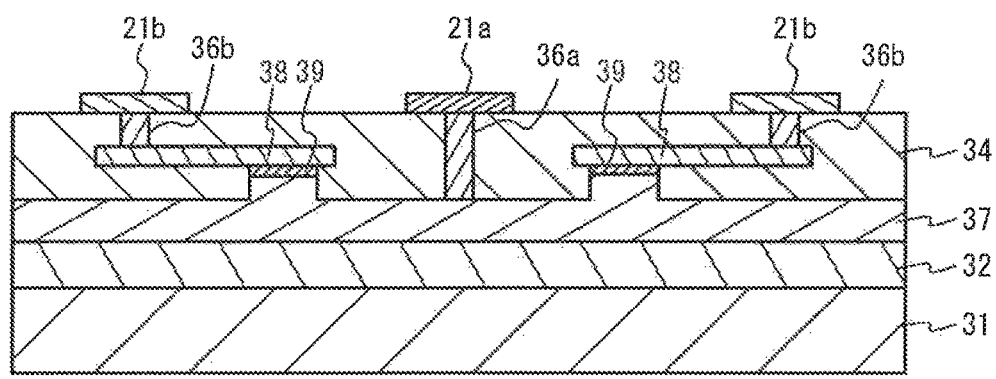
FIG. 13 illustrates another example of FIG. 4B.

In FIG. 4B, the phase modulator having the pn junction structure is described. However, the structure is not limited. For example, a phase modulator having a semiconductor/insulator/semiconductor structure may be used. FIG. 13 illustrates another example of FIG. 4B. As illustrated in FIG. 13, the portion of the semiconductor Mach-Zehnder modulator 10 in which the phase modulator is provided may have a structure in which the $SiO_2$ layer 32, a p-type Si layer 37 and the $SiO_2$ layer 34 are formed on the Si substrate 31. In the structure, a ridge acting as an optical waveguide is made of p-type Si. An n-type poly Si layer 38 is provided on the upper face of the ridge through a gate oxide film 39. The n-type poly Si layer 38 is coupled to the transmission line electrode 21b via the metal contact via 36b. In the structure, a voltage is applied to a structure of poly Si/the gate oxide film 39/Si (crystal). The applying of the voltage changes a carrier density of interface of the gate oxide film 39/Si (crystal) and changes a phase of a propagating light.

Effect of Embodiments

In the embodiment, the first amplifier 302 for amplifying an electrical signal input from the input signal transmission line 301 is provided. With the structure, it is possible to adjust impedance by branching the electrical signal. Thus, it is easy to design a signal line from the input signal transmission line 301 to the phase modulators 21 and 22. That is, high adjustment accuracy of impedance and a propagation time of the signal line is achieved. Therefore, a preferable optical modulation efficiency can be achieved.

In the embodiment, the second amplifier 303 is provided between the first amplifier 302 and the first differential output amplifier 307. And, the third amplifier 304 is provided between the first amplifier 302 and the second differential output amplifier 308. The second amplifier 303 and the third amplifier 304 attenuate returning intensity of a reflection wave occurring when impedance matching between output impedance of the first amplifier 302 and impedance of downstream side circuits is bad. Therefore, bad influence on the first amplifier 302 may be suppressed. In the embodiment, the first differential output amplifier 307 and the second differential output amplifier 308 are provided. Thus, signals input into the phase modulators 21 and 22 are respectively amplified.

In the embodiment, the phase modulators 21 and 22 of transmission line type are used. Thus, it is possible to achieve high speed operation even if each electrode is elongated, compared to a lumped constant type phase modulator. It is therefore possible to reduce the number of differential output amplifiers.

In the embodiment, lengths of the first signal transmission line 305 and the second signal transmission line 306 are adjusted so that a time τ2 needed for an electrical signal to travel from the first amplifier 302 to the transmission line electrode 22b is longer than a time 11 needed for the electrical signal to travel from the first amplifier 302 to the transmission line electrode 22b. It is therefore possible to suppress influence of a propagation delay of lights in the arm waveguides 13a and 13b on an optical modulation efficiency.

In the embodiment, a plurality of phase modulators 21 and 22 are used. It is therefore possible to compensate for attenuation of a voltage signal by overlapping phase changing. In a case where an electrical signal is attenuated during propagation in a transmission line type electrode, intensity (amplitude) of an optical signal to be modulated becomes smaller as a frequency of the input electrical signal (Baud Rate) becomes higher when a high speed optical modulation signal to be modulated is formed from a high speed input electrical signal. That is, a modulation factor becomes smaller. One of reasons is that although a current flows into only a surface portion of a transmission line electrode because of a skin effect during propagation of a high frequency electrical signal, a skin depth becomes smaller and an electrical resistance in the propagation increases as the frequency of the electrical signal becomes higher, and thereby increasing of propagation loss may degrade the frequency characteristic. In the case of the semiconductor Mach-Zehnder modulator 10, a current flows in semiconductor to the pn junction portion or the structure of poly Si/the gate oxide film/Si (crystal) in addition to the skin effect of the electrode as illustrated in FIG. 4B or FIG. 9). A series connection of the capacitance and the electrical resistance is formed in the pn junction portion or the structure of Si/the gate oxide film/Si (crystal). When a frequency becomes higher, the number of round trips of a current because of charge and discharge to the capacitance increases and a loss caused by the resistance of the portion increases. And the loss is added to the propagation loss of the electrical signal. Therefore, there is a problem that the reduction of the modulation amplitude of the optical signal to be modulated on the higher frequency side is remarkable because of the attenuation of the electrical signal during the propagation of the electrical signal in the transmission line type electrode, as in the case of the semiconductor Mach-Zehnder modulator 10. It is very effective to use the plurality of phase modulators 21 and 22 to solve the problem.

In the embodiments, the semiconductor Mach-Zehnder modulator 10 is an example of a Mach-Zehnder modulator that includes a mesa-shaped semiconductor waveguide formed on a substrate. The phase modulators 21 and 22 are examples of a plurality of phase modulators of transmission line type that are spaced from each other along the semiconductor waveguide of the Mach-Zehnder modulator acting as an arm, and changes a phase of a light propagating in the arm. The first amplifier 302 is an example of a first amplifier that is coupled with a transmission line transmitting an input electrical signal, has input impedance substantially equal to characteristic impedance of the transmission line, and amplifies the input electrical signal. The first signal transmission line 305 is an example of a first interconnection that inputs an output of the first amplifier into a first end of one of the plurality of phase modulators that is provided on an input side of the Mach-Zehnder modulator. The second signal transmission line 306 is an example of a second interconnection that inputs the output of the first amplifier into a first end of the other of the plurality of phase modulators that is provided on an output side of the Mach-Zehnder modulator. The termination resistors 23 and 25 are examples of a plurality of termination resistors that are respectively coupled to second ends of the plurality of phase modulators and have a resistance equal to characteristic impedance of the phase modulator coupled therewith. The first differential output amplifier 307 is an example of a first differential output amplifier that amplifies the output of the first amplifier and inputs outputs amplified by the first differential output amplifier to the two transmission line electrodes of the phase modulator on the input side of the Mach-Zehnder modulator. The second differential output amplifier 308 is an example of a second differential output amplifier that amplifies the output of the first amplifier and inputs outputs amplified by the second differential output amplifier to the two transmission line electrodes of the phase modulator on the output side of the Mach-Zehnder modulator. The second amplifier 303 is an example of a second amplifier that is provided between the first differential output amplifier and the first amplifier, in the first interconnection. The third amplifier 304 is an example of a third amplifier that is provided between the second differential output amplifier and the first amplifier, in the second interconnection.

What is claimed is:

1. An optical modulation device comprising:
   a Mach-Zehnder modulator that includes a mesa-shaped semiconductor waveguide formed on a substrate;
   a plurality of phase modulators of transmission line type that are spaced from each other along the semiconductor waveguide of the Mach-Zehnder modulator;
   a first amplifier that is coupled with an input transmission line transmitting an electrical signal, has an input impedance substantially equal to a characteristic impedance of the input transmission line, and amplifies the electrical signal;
   a first interconnection that is coupled to the first amplifier and transmits the electrical signal to a first end of one of the plurality of phase modulators that is provided on an input side of the Mach-Zehnder modulator;
   a second interconnection that is coupled to the first amplifier and transmits the electrical signal to a first end of another of the plurality of phase modulators that is provided on an output side of the Mach-Zehnder modulator; and
   a plurality of termination resistors that are respectively coupled to second ends of the plurality of phase modulators.

2. The optical modulation device as claimed in claim 1, wherein the first amplifier has an output impedance smaller than the input impedance.

3. The optical modulation device as claimed in claim 1, further comprising:
   a branch circuit that is coupled with the first amplifier, divides the electrical signal into a plurality of electrical signals, and transmits two of the plurality of the electrical signals to the first and second interconnections.

4. The optical modulation device as claimed in claim 1, wherein the second interconnection has a longer length than that of the first interconnection so that the electrical signal transmitted in the second interconnection has a propagation time longer than that in the first interconnection.

5. The optical modulation device as claimed in claim 1, wherein the semiconductor waveguide includes a Si waveguide.

6. The optical modulation device as claimed in claim 1, wherein:
   the semiconductor waveguide has a pn junction;
   the plurality of phase modulators have a transmission line electrode and a reference potential electrode, the transmission line electrode being coupled with the first interconnection or the second interconnection;
   the transmission line electrode is electrically coupled with one side of the pn junction; and
   the reference potential electrode is electrically coupled with the other side of the pn junction.

7. The optical modulation device as claimed in claim 1, wherein:
   the semiconductor waveguide has a semiconductor/insulator/semiconductor structure;
   the plurality of phase modulators have a transmission line electrode and a reference potential electrode, the transmission line electrode being coupled with the first interconnection or the second interconnection;
   the transmission line electrode is electrically coupled with one side of the semiconductor/insulator/semiconductor structure; and
   the reference potential electrode is electrically coupled with the other side of the semiconductor/insulator/semiconductor structure.

8. The optical modulation device as claimed in claim 1, wherein:
   each of the plurality of phase modulators has a pair of transmission line electrodes;

the first interconnection has a first differential amplifier that amplifies the electrical signal output from the first amplifier, produces a first pair of differential signals, and transmits the first pair of differential signals to the pair of transmission line electrodes of the phase modulator on the input side of the Mach-Zehnder modulator; and the second interconnection has a second differential amplifier that amplifies the electrical signal output from the first amplifier, produces a second pair of differential signals, and transmits the second pair of differential signals to the pair of transmission line electrodes of the phase modulator on the output side of the Mach-Zehnder modulator.

9. The optical modulation device as claimed in claim 8, further comprising:
   a second amplifier that is provided between the first differential amplifier and the first amplifier, in the first interconnection; and
   a third amplifier that is provided between the second differential amplifier and the first amplifier, in the second interconnection.

10. The optical modulation device as claimed in claim 9, wherein:
   an output voltage of the first differential amplifier substantially linearly varies in a whole range of amplitude of an output voltage of the second amplifier; and
   an output voltage of the second differential amplifier substantially linearly varies in a whole range of amplitude of an output voltage of the third amplifier.

11. The optical modulation device as claimed in claim 8, wherein output voltages of the first differential amplifier and the second differential amplifier substantially linearly vary in a whole range of amplitude of an output voltage of the first amplifier.

12. The optical modulation device as claimed in claim 1, wherein:
   the Mach-Zehnder modulator and the plurality of phase modulators are provided in a modulator chip;
   the first amplifier, the first interconnection and the second interconnection are provided in a driver chip; and
   the modulator chip is coupled with the driver chip through a bump.

13. The optical modulation device as claimed in claim 1, wherein the second interconnection delays the output of the first amplifier more than the first interconnection and inputs, after delaying, the output into a transmission line electrode of one of the plurality of phase modulators on an output side of the Mach-Zehnder modulator.

14. The optical modulation device as claimed in claim 1, wherein at least one of the first interconnection and the second interconnection has a variable capacitance diode so as to adjust a propagation time of the electrical signal.

15. The optical modulation device as claimed in claim 1, wherein the electrical signal includes a multivalued modulation component.

* * * * *